United States Patent

Bower et al.

[11] 4,053,849
[45] Oct. 11, 1977

[54] OSCILLATION MEANS FOR GENERATING A DIFFERENTIAL AC SIGNAL PROPORTIONAL TO MOVEMENT OF A CONDUCTING MEMBER

[75] Inventors: Gerald S. Bower, Templeton; Scott F. Voelker, Lafayette, both of Calif.

[73] Assignee: Systron Donner Corporation, Concord, Calif.

[21] Appl. No.: 728,854

[22] Filed: Oct. 1, 1976

[51] Int. Cl.² .................................. G08C 21/00
[52] U.S. Cl. ............................ 331/65; 324/34 D; 328/5; 331/117 R; 340/195; 340/258 C; 340/282; 361/180
[58] Field of Search ........... 324/34 R, 34 PS, 34 D; 179/1 P; 328/1, 5; 331/65, 117 R; 332/51 R; 340/195, 196, 199, 258 C, 262, 282; 361/180, 203; 323/51; 307/308

[56] References Cited

U.S. PATENT DOCUMENTS

| 3,109,145 | 10/1963 | Morris et al. | 340/196 |
| 3,474,332 | 10/1969 | Brown | 331/65 |
| 3,963,996 | 6/1976 | Skerlos | 331/117 R |
| 3,967,064 | 6/1976 | Signorth | 328/1 |

Primary Examiner—Robert J. Corcoran
Attorney, Agent, or Firm—Flehr, Hohbach, Test

[57] ABSTRACT

A high frequency pickoff is disclosed having two spaced inductors electrically connected in series and a capacitor connected in parallel with the inductors, thereby forming a parallel resonant circuit. A conducting member is mounted for motion in the space between the two inductors. A pair of transistors are mounted in push/pull configuration to alternately connect first one end and then the other of the resonant circuit to a source of electrical energy. The source disclosed is a current source for matching the high impedance of the parallel resonant circuit. When the electrical energy is switched at substantially the resonant frequency of the parallel circuit, differential motion of the conducting member relative to the inductors provides differential amplitude output at the frequency of resonance of electrically opposed ends of the resonant circuit. A configuration for enhancing gain in the pickoff circuit includes tuning capacitors connected parallel with each of the inductors and providing similar resonant frequencies therewith slightly removed from the overall circuit resonant frequency. Pickoff circuit gain is enhanced by an increase in the differential output due to changes occurring in each inductance as well as changes occurring in the frequency of maximum impedance associated with each tuned inductive capacitive leg of the circuit.

4 Claims, 4 Drawing Figures

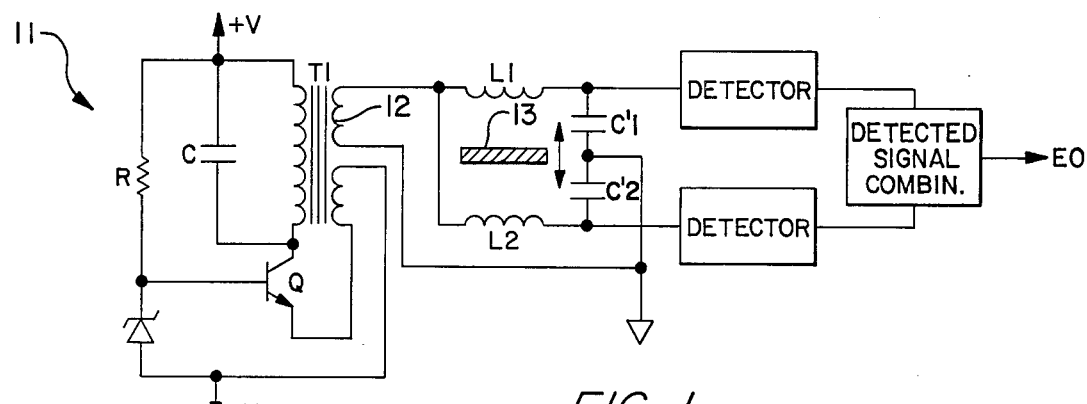
FIG.-1 (OLD ART)
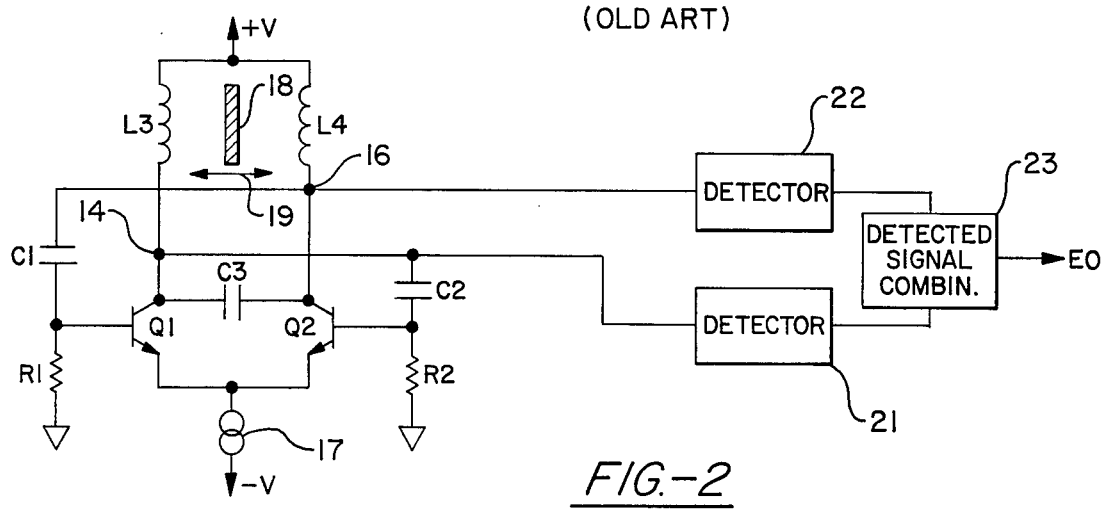
FIG.-2
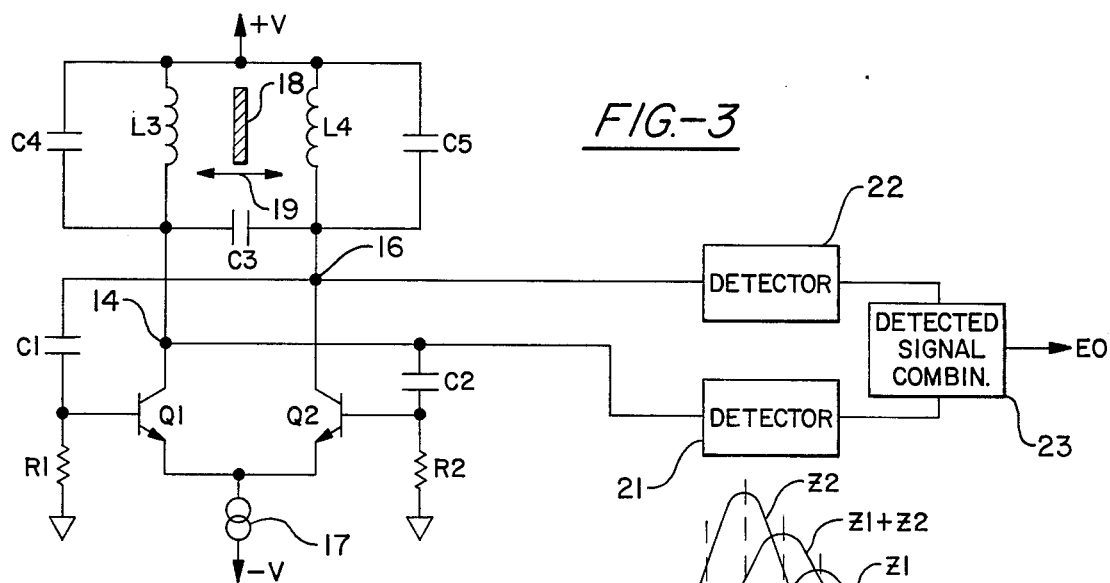
FIG.-3
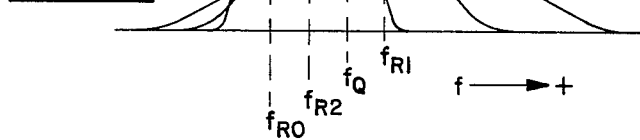
FIG.-4

OSCILLATION MEANS FOR GENERATING A DIFFERENTIAL AC SIGNAL PROPORTIONAL TO MOVEMENT OF A CONDUCTING MEMBER

BACKGROUND OF THE INVENTION

The invention relates to a pickoff or signal generator and more particularly to such a pickoff for use in transducing mechanical motion to electrical output.

Electrical pickoffs for use in transducers for transposing mechanical motion to electrical output are known in the art and may take the form of potentiometers, inductive pickoffs, capacitive pickoffs, piezoelectric pickoffs or any one of a wide variety of other pickoffs for sensing a mechanical quantity and transposing it to an electrical signal. Such pickoffs utilizing AC signals are desirable because they obviate the need for sliding mechanical contacts and attendant noise associated therewith. Other sources of noise are also more easily suppressed through the use of AC pickoffs. Variable C type pickoffs are known wherein a separate oscillator is utilized and coupled through two or more secondaries to series resonant circuits having inductors therein with a moving conducting member configured for mechanical motion relative to the inductors. The problems with these latter types of circuits involve the necessity for RF type transformers precluding any possibility of miniaturized hybrid pickoff circuitry. These circuits have limited gain potential which has an effect on the dynamic range obtainable. Moreover, a variable Q type pickoff having a separate oscillator circuit and two series tuned inductive capacitive resonant circuits requires a great deal of adjustment at high oscillator frequencies due to stray capacitance and interaction between the resonant circuits.

There is a need, therefore, for a variable Q type pickoff which is capable of being hybridized, requires little adjustment time during assembly, and is more efficient allowing higher gain to be provided by the pickoff circuit itself and consequent enlargement of dynamic range.

SUMMARY AND OBJECTS OF THE INVENTION

An oscillator is disclosed which is capable of being coupled to an electrical energy source and which has therein a resonant circuit having a predetermined resonant frequency with electrically opposed terminals on the resonant circuit. A pair of inductors are mounted in spaced relation and are connected in series within the resonant circuit. A capacitor is also included in the resonant circuit and is connected in parallel with the pair of inductors. An electrically conductive member is mounted between and disposed for differential motion with the inductors, resulting in motion toward one of the inductors when motion is away from the other. A pair of electronic switches operates to couple the electrical energy source alternately to the electrically opposed ends of the resonant circuit at a frequency which is substantially coincident with the resonant frequency of the circuit. In this fashion the amplitude of the frequency of resonance is caused to change differentially at the electrically opposed ends of the resonant circuit as a result of differential motion of the electrically conductive member between the inductors.

In general, it is an object of the present invention to provide an electrical pickoff having greater efficiency and consequent greater dynamic range.

Another object of the present invention is to provide an electrical pickoff utilizing a minimum of interacting resonant circuit sections.

Another object of the present invention is to provide an electrical pickoff which dispenses with the need for RF type transformers.

Another object of the present invention is to provide an electrical pickoff in which the desired resonant frequencies may be readily obtained by use of selected capacitors with large capacitance value tolerances.

Another object of the present invention is to provide an electrical pickoff which is stable and easily adjusted at high pickoff frequencies.

Additional objects and features of the invention will appear from the following description in which the preferred embodiment has been set forth in detail in conjunction with the accompanying drawings.

BRIEF DESCRIPTION OF THE DRAWINGS

FIG. 1 is a schematic diagram of a recent development in variable Q type pickoffs representing art in the field of this disclosure.

FIG. 2 is an electrical schematic of the variable Q pickoff of this disclosure.

FIG. 3 is a high gain alternate embodiment of the variable Q pickoff of this disclosure.

FIG. 4 is a graph of Q curves associated with the circuit of FIG. 3.

DESCRIPTION OF THE PREFERRED EMBODIMENTS

Circuits for pickoffs existing in this field may be seen in U.S. Letters Pat. No. 3,109,145 and U.S. Letters Pat. No. 3,967,064, both of which are assigned to the assignee of the instant invention. The U.S. Pat No. 3,109,165 discloses circuitry including a separate oscillator which is transformer coupled to a pair of coils which are loosely coupled to a respective pair of resonant circuits for providing differential output signals. A conducting member is provided for movement between the pair of coils operating to change the inductance in the coils dependent upon the relative position of the moving conductive member, and to thereby couple more or less energy into the respective resonant circuits for producing the aforementioned differential output. The U.S. Pat. No. 3,967,064 on the other hand, represents an improvement over the U.S. Pat. No. 3,109,145, inasmuch as the separate oscillator directly drives the resonant circuits which produce the differential output, so that the amplification obtained through resonance is limited only by the power dissipation capabilities of the pickoff coils themselves. It will be noted, however, that in both of the foregoing circuits there are as many as three separate resonant sections, all of which interrelate with each other and which require painstaking adjustment when the oscillator frequency is relatively high. This may be seen in the circuit of FIG. 1 which closely resembles the circuit in one embodiment of the U.S. Pat. No. 3,967,064, utilizing a separate oscillator 11 which is transformer coupled through a transformer T1 to a driving secondary 12 for exciting a pair of series tuned resonant circuits consisting of inductor L1 and capacitor C1, and inductor L2 and capacitor C2 respectively. The differential output produced by the motion of moving electrically conductive member 13 produces a differential output connected to a pair of detectors as shown and subsequently directed to some means for combining the detected outputs, also as shown in FIG. 1.

FIG. 2 shows the circuit disclosed herein having a pair of spaced inductors L3 and L4 which are connected in series between the ends of a tuning capacitor C3 which is in parallel with the series inductance of L3 and L4. A parallel inductive capacitive resonant circuit is therefore provided having opposing electrical terminals 14 and 16. Means for switching a source of electrical energy such as current source 17 between the opposing electrical terminals 14 and 16 is provided by transistors Q1 and Q2. Capacitors C1 and C2 provide positive feedback to the base connections of transistors Q1 and Q2 respectively and resistors R1 and R2 provide the proper bias for the transistors, whereby the circuit of FIG. 2 functions as an oscillator at a frequency which is approximated by the following relationship $$f_R = \frac{1}{2\pi \sqrt{(L3 + L4) C3}}$$

An electrically conductive member 18 is disposed between the spaced inductors L3 and L4 for motion therebetween as indicated by arrow 19. Opposing electrical terminals 14 and 16 are connected to detectors 21 and 22 respectively which provide signals therefrom which are combined in a detected signal combination network 23 and presented as an output seen here as $E_O$.

The manner in which the circuit of FIG. 2 operates may be likened to the operation of an inductive divider having a moving tap for sliding along the inductance provided by the series connected inductors L3 and L4. The resonant frequency $f_r$ is stable and is determined for all practical purposes by the parallel combination of capacitance C3 with series inductance L3 and L4. The impedance or Q curve for the entire circuit of FIG. 2 does not vary appreciably for motion of conductive member 18. However, as conductive member 18 moves in the direction of arrow 19 toward inductance L3, for example, the inductances in L3 and L4 will change differentially, but the total inductance will remain substantially the same for the small motions of conductive member 18. If conductive member 18 in nonmagnetic, such as aluminum, motion thereof toward inductance L3 will reduce the inductance of inductor L3 and increase the inductance of inductor L4. Consequently the amplitude of the signal at terminal 14 will fall an amount dependent upon the movement of conductive member 18 and the amplitude of the signal at terminal 16 will rise approximately the same amount. A differential output is therefore obtained between electrical terminals 14 and 15 which is transmitted to detectors 21 and 22 respectively, as recited above. The detected differential output is connected to the signal combination net 23, also recited above, for producing output $E_O$.

Turning now to FIG. 3 a modification to the circuit of FIG. 2 is shown wherein capacitors C4 and C5 are connected in parallel with each of the series connected inductors L3 and L4 respectively. Capacitors C4 and C5 are selected to adjust a resonant frequency in the parallel combination of C4 and L3 which is precisely the same as the resonant frequency obtained from the parallel combination of capacitor C5 and inductor L4. Capacitor C3 in the embodiment of FIG. 3 is thereafter selected to provide a circuit resonance which is at a slight variance from the similar resonant frequencies of the C4/L3 and C5/L4 circuit sections. In the instance where moving conductive member 18 is nonmagnetic, as described for FIG. 2 above, the circuit resonant frequency obtained by C3 will be just below the C4/L3 and C5/L4 resonant frequencies. These latter two resonant frequencies have the same impedance for one position of electrically conducting member 18. There are, therefore, three resonant frequencies in the circuit of FIG. 3, one each for the C4/L3 and C5/L4 circuit sections and one composite frequency where the oscillator circuit of FIG. 3 runs which is determined by the entire network in the two collectors of transistors Q1 and Q2. When the conducting member 18 moves from its position where the C4/L3 and C5/L4 impedances are substantially the same, the impedances therein change, the Q of each circuit section changes and the frequency of maximum resonance of each circuit section changes. The overall frequency of oscillation of the circuit of FIG. 3 does not change however, for the impedances in the two parallel resonant circuit sections change differentially and therefore the total impedance of the circuit of FIG. 3 remains the same.

The following relations may be said to approximate resonant frequencies of the various sections of the circuit of FIG. 3

$$f_{R1} = \frac{1}{2\pi \sqrt{L3C4}}$$

$$f_{R2} = \frac{1}{2\pi \sqrt{L4C5}}$$

$$f_{R3} = \frac{1}{2\pi \sqrt{(L3 + L4) \left( \frac{C4C5}{C4 + C5} + C3 \right)}}$$

The operation of the circuit of FIG. 3 may be readily described by reference to FIG. 4. Since the inductance of L3 and L4 change as electrical conductive element 18 moves therebetween, in the situation where electrical conductive element 18 is nonmagnetic, a motion toward L3 will cause a reduction in the impedance of the C4/L3 circuit section due to the reduction in the inductance in L3. Thus, there will be a lesser drop across the impedance of that portion of the circuit of FIG. 3 for a constant current through the circuit and at the same time the frequency of resonance rises as may be seen by the reference to $f_{R1}$ above. $f_{R1}$ is shown in FIG. 4 as above the quiescent frequency $f_2$ and also as having a lesser amplitude due to the decrease in the value of $z_1$. $z_2$ rises due to the rising inductance in L4 and $f_{R2}$ falls as also seen in FIG. 4. The circuit resonance is represented at $f_{RO}$. Thus, greater gain is obtained through the use of the circuit of FIG. 4 due to the effect of the differential across the two resonant circuits due to the changes in impedance, $z_1$ and $Z_2$, where the drop is large across $Z_2$ for a constant current and small across $Z_1$ for constant current. The resonant frequency $f_{R2}$, which is the frequency of maximum impedance for parallel resonant circuits, is closer to $f_{RO}$ for enhancing the drop across $Z_2$ and for likewise decreasing the drop across $Z_1$ as the C4/L3 circuit section resonant frequency moves away from $f_{RO}$. An even greater differential is obtained at electrically opposed terminals 14 and 16 as compared to the circuit of FIG. 2. Thus, greater signal gain is obtained in the circuit of FIG. 3 than that obtained in the circuit of FIG. 2.

The circuit of FIG. 2 has advantages in simplicity of adjustment since there is a minimum of interaction between circuit components. Capacitor C3 is selected for the resonant frequency of the circuit which allows easy adjustment for high circuit frequencies from 200 kilohertz up to 25 megahertz and beyond. The circuit of FIG. 3 on the other hand, provides greater gain as explained above, but is more difficult to adjust at higher frequencies due to the presence of stray capacitance affecting the frequencies of resonance. It should be noted that while both circuits of FIG. 2 and 3 are represented as being energized by a current source 17, circuit modifications are envisioned which would allow voltage source excitation. In the interests of simplification in the explanation herein, current sources have been depicted because it is more difficult to obtain zero impedance voltage sources than it is to obtain high impedance current sources to obtain good power supply and driven circuit impedance matching and consequent power transfer efficiency.

What is claimed is

1. An electrical oscillator for use in transducing mechanical motion to an electrical output comprising a resonant circuit having a predetermined resonant frequency, first and second terminals on electrically opposed ends of said resonant circuit, first and second inductors mounted in spaced relation and connected in series within said resonant circuit, a capacitor within said resonant circuit connected in parallel with said first and second inductors, an electrically conductive member mounted between and disposed for differential motion relative to said first and second inductors, whereby motion toward one of said first and second inductors is away from the other of said first and second inductors, first and second electronic switches operating to couple an electrical energy source alternately to said first and second terminals at a frequency substantially coincident with said predetermined resonant frequency, whereby the amplitude of said predetermined resonant frequency changes differentially at said first and second terminals with differential motion of said electrically conductive member.

2. An oscillator as in claim 1 together with first and second additional capacitors connected in parallel with said first and second inductors respectively, thereby providing first and second additional resonant circuits having substantially identical additional resonant frequencies for one position of said electrically conductive member, said additional resonant frequencies being spaced in the frequency spectrum from said predetermined resonant frequency and being altered differentially by movement of said electrically conductive member from said one position, whereby said differential amplitude change of said predetermined resonant frequency is enhanced.

3. A differential AC signal generator for use in transducing mechanical motion to an electrical output, comprising first and second resonant circuits having substantially identical first and second resonant frequencies, said first and second resonant circuits being connected in series and each including an inductor and a capacitor connected in parallel, said inductors being mounted so that there is a predetermined space therebetween, an oscillation tuning capacitor connected in parallel with said series connected first and second resonant circuits, said parallel circuit including said oscillation tuning capacitor defining a third resonant frequency, a conducting member disposed for differential motion in said predetermined space relative to said inductors, and electronic switching means operating to alternately apply electrical energy to said first and second resonant circuits at substantially said third resonant frequency, whereby said differential motion of said conducting member causes differential change in inductance in said first and second resonant circuits and differential change in amplitude of oscillation at said third resonant frequency at electrically opposed terminals of said oscillation tuning capacitor.

4. A differential AC signal generator for use in transducing mechanical motion to an electrical output comprising first and second inductors electrically connected in series and being mounted so that there is a predetermined space therebetween, an oscillation tuning capacitor connected to form a parallel inductive capacitive circuit with said series connected first and second inductors, said parallel circuit being resonant at a predetermined signal frequency, a conducting member disposed for differential motion in said predetermined space relative to said first and second inductors, and electronic switching means operating to alternately apply electrical energy to said first and second inductors at substantially said predetermined signal frequency, whereby differential motion of said conducting member causes differential change in amplitude of oscillation at said predetermined signal frequency at electrically opposed ends of said parallel inductive capacitive circuit.

* * * * *